United States Patent [19]

Burgbacher

[11] 4,370,580

[45] Jan. 25, 1983

[54] RELUCTANCE MOTOR

[75] Inventor: Martin Burgbacher, St. Georgen, Fed. Rep. of Germany

[73] Assignee: Papst Motoren GmbH und Co. KG, St. Georgen, Fed. Rep. of Germany

[21] Appl. No.: 158,982

[22] Filed: Jun. 12, 1980

[30] Foreign Application Priority Data

Jun. 23, 1979 [DE] Fed. Rep. of Germany ....... 2925392

[51] Int. Cl.³ ............................................. H02K 19/14
[52] U.S. Cl. .................................. 310/67 R; 310/211; 310/163
[58] Field of Search .......................... 310/67, 162–165, 310/211

[56] References Cited

U.S. PATENT DOCUMENTS 3,775,626  11/1973  Burgbacher .......................... 310/67

Primary Examiner—Donovan F. Duggan
Attorney, Agent, or Firm—Horst M. Kasper

[57] ABSTRACT

A reluctance motor with a squirrel-cage external rotor has a magnetically active yoke cross-section which is narrowed over the bottom of the rotor slots at least in the pole middle. In a small region corresponding only to part of the pole pitch and located around the pole middle series of non-magnetic portions are provided in the rotor yoke. The stator winding of the motor is provided as a machine-wound winding with one coil for each pole and phase.

6 Claims, 5 Drawing Figures

PHASE
· · · · I
- - - II
——— III

RELUCTANCE MOTOR

BACKGROUND OF THE INVENTION

1. Field of the Invention

This invention relates to a reluctance motor with a squirrel-cage external rotor.

2. Brief Description of the Background of the Invention Including Prior Art

External rotor reluctance motors are known and a conventional external reluctance motor is described in U.S. Pat. No. 3,775,626, which is herein incorporated by reference.

In such motors on both sides of the pole middles conducting paths for the magnetic flux of the motor are formed. In reluctance motors with a squirrel cage rotor an improved distribution of the windings is desired. This implies smaller steps and smaller slot pitches and a larger number of coils. Such motors exhibit with relatively few slots poor operational characteristics such as bad starting bahavior, smaller torques in synchronism. On the other hand it is desired to reduce the number of coils such as to allow to wind the stator by machine.

SUMMARY OF THE INVENTION

1. Purposes of the Invention

It is an object of the invention to provide a reluctance motor with a squirrel-cage rotor, which is improved.

It is another object of the invention to provide a reluctance motor which can be machine-wound and shows good operational characteristics.

These and other objects and advantages of the present invention will become evident from the description which follows.

2. Brief Description of the Invention

The present invention provides a reluctance motor comprising a stator and an external squirrel-cage rotor. The stator has a plurality of poles and a machine-wound winding with one coil for each pole and phase combination. The rotor comprises a plurality of pole portions each having respective pole ends, a pole span between said ends and a pole middle and a plurality of flux path portions extending towards the inside of the rotor and surrounding rotor slots. Aligned with the slots of the rotor yoke-reducing, non-magnetic portions are provided only in a region corresponding to a fraction of from about 0.2 to 0.6 and preferably from about 0.25 to 0.50 of the range corresponding to a pole pitch and located around the pole middle.

Preferably the plurality of poles comprises four poles, a three phase alternating current is employed, the stator has preferably 24 slots and the rotor 30 rotor slots and the number of yoke-reducing, non-magnetic portions of the rotor alternates between three and four along the circle of the rotor. The yoke-reducing non-magnetic portions of the rotor can have cylindrical shape with their cylindrical axes being parallel to the rotation axis and the diameters of the cylinders located near the pole middle can be less or equal to the diameter of a cylinder more remote from the pole middle.

In another aspect of the invention at least the yoke-reducing non-magnetic portions close to the pole middles are spaced radially such in the rotor that between them and the corresponding neighboring slot bottom and between them and the outer circonference of the rotor magnetic bridges are formed having a radial minimum thickness and a maximum length in tangential direction.

The invention accordingly consists in the features of construction, combination of elements and arrangement of parts which will be exemplified in the article of manufacture hereinafter described and of which the scope of application will be indicated in the appended claims.

BRIEF DESCRIPTION OF THE DRAWINGS

In the accompanying drawings in which is shown one of the various possible embodiments of the invention.

DETAILED DESCRIPTION OF THE PREFERRED EMBODIMENTS

Figure 1:
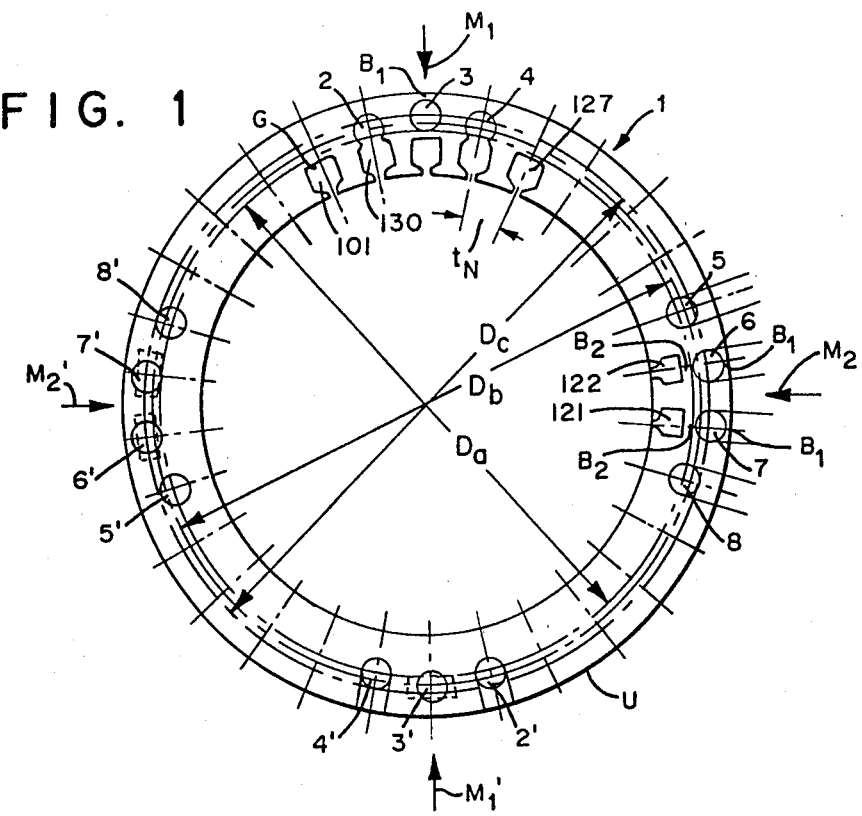
FIG. 1 is a schematic sectional view of a squirrel-cage rotor.

In accordance with the present invention a reluctance motor with a short-circuit external rotor is provided. The magnetically active yoke cross-section of the rotor is narrowed at least in each pole middle above the bottom of the rotor slots of the short circuit cage. In a small range corresponding only to a part, for example ⅓, of the pole pitch a series of non-magnetic portions are provided in the rotor yoke which are directed toward the rotor slots. The stator winding of the motor is a machine winding for one coil pro pole and phase.

Surprisingly it was found that in an external rotor reluctance motor employing a relatively coarse slotted machine winding it is possible to achieve motor characteristics which are as good as those of more involved windings with more requirements.

Of course the motor does not deteriorate when employing non-magnetic portions over a larger part of the pole pitch as is shown in U.S. Pat. No. 3,775,626 and furthermore in a more requiring way two coils pro pole and phase are possible. However, the invention allows with smaller economic expenditures to manufacture a good motor at one coil pro pole and phase in large series production with machine-wound windings.

In particular, the invention is effective in a two pole external rotor motor. Such embodiment is similar to the four pole embodiment shown in FIG. 1. In a four pole rotor sheet metal stamping 1 are provided alternating from pole middle $M_1$ ... to pole middle $M_2$ ... three and four non-magnetic portions, respectively, 2–4, 5–8. They are located in the yoke of the external rotor and these three and four, respectively, portions are disposed in each case symmetrically with respect to the pole middles. This follows from the number of 30 slots $t_N = 2\pi/30$ and the required correspondence of the non-magnetic portions to the slots 101–130. As shown the middle non-magnetic portion 3 and the two inner non-magnetic portions 6,7, which are neighboring the pole middle, are somewhat smaller than the portions 2,4 situated more remote from the pole middles and as shown here the portions 2,4 can be united with the corresponding slots. Thus it is possible to place the smaller non-magnetic portions 3, 6, 7 radially such between the outer circonference U of the rotor yoke and the bottom of the slot G of the slot corresponding in the respective case as to provide for a still radially relatively wide bridge between the non-magnetic portion and the slot bottom, $B_2$, and also between the non-magnetic portion and the outer circonference of the rotor yoke, $B_1$. These bridges allow for conduction of the cross flux and are to show a high magnetic resistance. On the other hand the sheet metal has to provide a certain stiffness for handling during manufacturing and extreme reductions of the yoke cross-section especially in the pole middle result in instability of such external rotor reluctance sheet metals.

Figure 4:
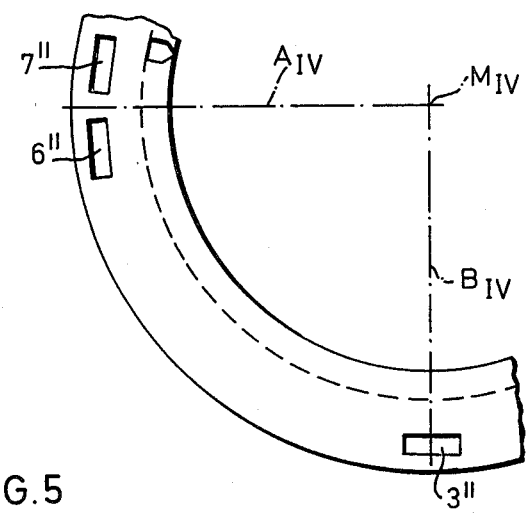

However, since the cross reactance in the pole middles is formed by a longer magnetic path in the direction of the circonference and correspondingly represents a larger resistance, such an arrangement of a relative diminution of the non-magnetic portions in the immediate vicinity of the pole middles is relatively advantageous and practicable. This is in particular the case as shown in the embodiment of FIG. 1, where every second pole $M_2$, $M_{2'}$, has on both sides of the pole middle one non-magnetic portion each. In particular, these non-magnetic portions in and around the pole middle can be very effectively formed rectangular as is shown in FIG. 4 of U.S. Pat. No. 3,775,626 and by a dashed line in FIG. 1 at the pole $M_1$. Alternatively, the non-magnetic portions can be formed elongated in circonferential direction or otherwise, for example as a long slot. Thus the bridges described provide longer magnetic paths in circonferential direction, that is in the direction of the cross flux. They provide a cross-section which is effective in increasing the cross reactance, but only slightly decreased and therefore with a larger magnetic resistance. The cross-section and the stability of the sheet metal are still relatively good, at least as the requirements of manufacture are concerned.

The equidistant slots 101 to 130 are displaced relative to each other by the slot pitch $t_N = \pi/15 = 12°$. Around the radial width of the bridge $B_2$ is situated the radial inner edge of the non-magnetic portions 3,6,7, 3',6',7' on the circle of diameter $D_a$ radially removed from the bottom G of the slots. The centers of the non-magnetic portions 5,8,5',8' are also on this circle, whereas the centers of the non-magnetic portions 2,4,2',4' are located on the circle of diameter $D_b$ and the centers of the non-magnetic portions 6,7,6',7' are located on the diameter $D_c$. In the embodiment shown the non-magnetic portions are circular. The size shown in FIG. 1 corresponds approximately to an actual size. The non-magnetic portions 3, 6, 7 have a diameter of 6 mm, the non-magnetic portions 2, 4, 5, 8 have a diameter of 6.8 mm. In case the non-magnetic portions are rectangular, as shown with dashed lines, compare 3', 6', 7', then the dimensions $D_a$, $D_b$, $D_c$ are nevertheless valid and are proportionately similar with larger or smaller embodiments than those shown herein. The width of the bridges $B_1$ and $B_2$ can be from about 1 mm to 3 mm and is preferably from about 1.5 to 2.5 mm. Of course, a bridge can be somewhat wider without interfering with the effectiveness of the rotor.

Figure 2:
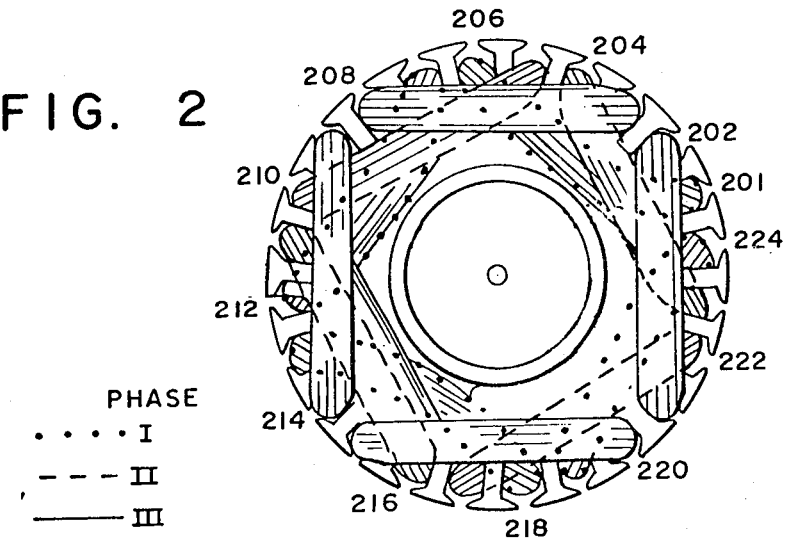
FIG. 2 is an axial plan view of a stator adapted to the rotor of FIG. 1.
Figure 3:
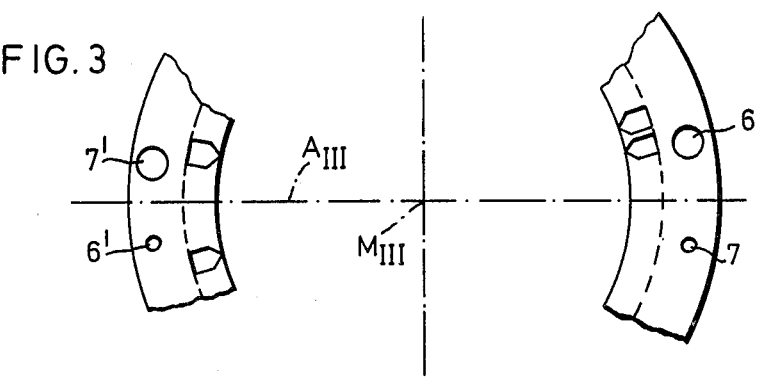
FIGS. 3 to 5 show parts of special embodiments according to FIG. 1.
Figure 5:
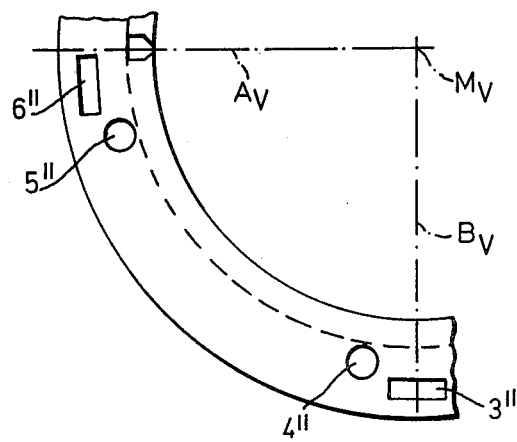

FIG. 2 shows in axial plan view the inner stator corresponding to the rotor of FIG. 1. The stator has 24 slots with the winding heads of a three phase machine-winding and in each slot is disposed one coil side and the phases I, II, III are wound successively into the slots 201–224. Thus the winding heads of each phase overlap those of the phase previously wound. The arrangement of the non-magnetic parts (which are in general openings in a usual production line sheet metal stamping) shown on the top and bottom of FIG. 1 are by themselves axial symmetrically to the axis $M_1M'_1$, similarly the arrangements shown on the left and on the right. These two different arrangements or openings alternate in circumferential direction, which creates a certain unsymmetry that is the magnetic situations are alternatively different for successive pole middles in circumferential direction. It is also possible that more than two types of magnetic forms (cyclical in this sense) can be provided in contrast to a completely symmetrical exciter field. In addition, the unsymmetry as shown in FIG. 1 can be further increased by providing openings which are not any longer symmetrical relative to the pole middle. For example, FIG. 3 shows the openings 6' and 7 relative to each other of the same size and smaller than the openings 6 and 7' relative to each other of the same size, as to follow for the cross-sections q in each case:

$q_6$ larger than $q_{6'}$
$q_6$ larger than $q_7$
$q_7$ smaller than $q_{7'}$
$q_{7'}$ larger than $q_{6'}$ In case to four (or n) stator poles four (or n) different or magnetically different configured or at least variable arrangements of the nonmagnetic parts or openings, respectively, are provided around the four (or n) pole middles of the rotor, this further embodiment of the invention provides smaller dynamic torque breaks when starting, since the field distortions are distributed spacially unequal and do not any longer support themselves in their disadvantageous effect. This is advantageous in all rotating field reluctance motors. The openings shown left and at the bottom of FIG. 1 in dashed lines by themselves result already in a certain improvement of the torque. This is especially the case when as shown on the left, two, or as shown at the bottom, one opening (nonmagnetic portion) elongated in circonferential direction are provided and this is continued along the circonference as is shown for example in FIG. 4 for one period of the circonferential cycle. The effect also occurs with a variation in accordance with FIG. 5. The magnetic situations according to FIGS. 4 and 5 are symmetrical to the axes A and B around the pole middles. However certain disturbances of the symmety, as shown for example in FIG. 3, can bring advantages relative to the torque breaks.

The invention allows also to build axially shorter motors with the same cylindrical installation volume, that is also the same weight, for a certain performance. The still relatively good field distribution according to the invention (also in connection with the cited U.S. patent) allows axially shorter motors (with a central inner space relatively larger in its diameter) for an axially compact disposition of the installation. Thus smaller ratios of L/D can be obtained wherein L is the axial length and D is the diameter of the installation space.

What is claimed as new and desired to be protected by Letters Patent is set forth in the appended claims:

1. A reluctance motor comprising:
 a stator comprising
 a plurality of poles,
 a winding with at least one coil for each pole and a phase combination providing a rotary magnetic field,
 a squirrel cage rotor comprising
 a plurality of pole portions, each having respective pole ends, a pole span between said ends and a pole middle,
 a plurality of flux path portions extending towards the air-gap side of the rotor between the rotor slots, wherein a region corresponding to a fraction from about 0.2 to 0.6 of the range corresponding to a pole pitch around the pole middle is provided with yoke-reducing, non-magnetic portions which are aligned with the slots of the rotor, said portions varying in their magnetic structure between pole portions subsequent on the circumference of the rotor.

2. A reluctance motor comprising:

a stator comprising a plurality of poles, a winding with at least one coil for each pole and phase combination providing a rotary magnetic field, a squirrel cage rotor comprising a plurality of pole portions, each having respective pole ends, a pole span between said ends and a pole middle, a plurality of flux path portions extending towards the air-gap side of the rotor between the rotor slots, wherein a region corresponding to a fraction from about 0.2 to 0.6 of the range corresponding to a pole pitch around the pole middle is provided with yoke-reducing, non-magnetic portions which are aligned with the slots of the rotor, said portions being off-set angularly with respect to the respective pole middle in a non equidistant manner between pole portions subsequent on the circumference of the rotor.

3. Motor according to claim 2 wherein the fraction is from about 0.25 to 0.50 of the range corresponding to a pole pitch.

4. Motor according to claim 2 wherein
the plurality of poles comprises four poles;
wherein three alternating current phases are employed;
wherein the stator has 24 slots;
wherein the rotor has 30 rotor slots; and
wherein the number of yoke-reducing, non-magnetic portions of the rotor is alternating between three and four.

5. Motor according to claim 2 wherein the yoke-reducing non-magnetic portions of the rotor have cylindrical shape with their cylindrical axis being parallel to the rotation axis; and wherein the diameters of the cylinders located near the pole middle are less or equal to the diameter of a cylinder more remote from the pole middle.

6. Motor according to claim 2 wherein at least the yoke-reducing non-magnetic portions close to the pole middles are spaced radially such in the rotor that between them and the corresponding neighboring slot bottom and between them and the outer circonference of the rotor are formed magnetic bridges which have a radial minimum thickness and a maximum length in tangential direction.

* * * * *